United States Patent [19]

Nakata et al.

[11] Patent Number: 5,002,021
[45] Date of Patent: Mar. 26, 1991

[54] INTAKE SYSTEM FOR MULTIPLE CYLINDER ENGINE

[75] Inventors: Mikio Nakata; Koichi Nagamoto, both of Hiroshima, Japan

[73] Assignee: Mazda Motor Corporation, Aki, Japan

[21] Appl. No.: 467,498

[22] Filed: Jan. 19, 1990

[30] Foreign Application Priority Data

Jan. 24, 1989 [JP] Japan .................................. 1-13231

[51] Int. Cl.⁵ ............................................ F02M 35/10
[52] U.S. Cl. ............................................ 123/52 MB
[58] Field of Search ......... 123/52 M, 52 MV, 52 MB, 123/52 MC, 52 ML, 52 MF

[56] References Cited

U.S. PATENT DOCUMENTS

| | | | |
|---|---|---|---|
| 3,990,415 | 11/1976 | Malphettes | 123/52 MB |
| 4,300,488 | 11/1981 | Cser | 123/52 M |
| 4,353,211 | 10/1982 | Cser et al. | 123/52 M |
| 4,364,340 | 12/1982 | Kimura | 123/52 MV |
| 4,821,685 | 4/1989 | Matsushima et al. | 123/52 MF |
| 4,878,460 | 11/1989 | Uchida et al. | 123/52 MV |

FOREIGN PATENT DOCUMENTS

| | | | |
|---|---|---|---|
| 54-9317 | 1/1979 | Japan . | |
| 58-172451 | 10/1983 | Japan . | |
| 61-190158 | 8/1986 | Japan . | |
| 61-192560 | 11/1986 | Japan . | |
| 0088219 | 4/1988 | Japan | 123/52 M |
| 0219866 | 9/1988 | Japan | 123/52 M |
| 0008316 | 1/1989 | Japan | 123/52 M |
| 2160264 | 12/1985 | United Kingdom | 123/52 M |

Primary Examiner—David A. Okonsky
Attorney, Agent, or Firm—Sixbey, Friedman, Leedom & Ferguson

[57] ABSTRACT

An intake system for a multiple cylinder engine includes a plurality of discrete intake passages which respectively communicate with the cylinders of the engines at the respective downstream ends and merge together at the respective upstream ends so as to form a merging portion, a common intake passage which communicates with the merging portion at the downstream ends and with the atmosphere by way of an air cleaner at the upstream end, and a resonance muffler which communicates with the air cleaner and has a resonance frequency which corresponds to the fundamental resonance frequency of the portion of the intake system upstream of the merging portion.

4 Claims, 4 Drawing Sheets

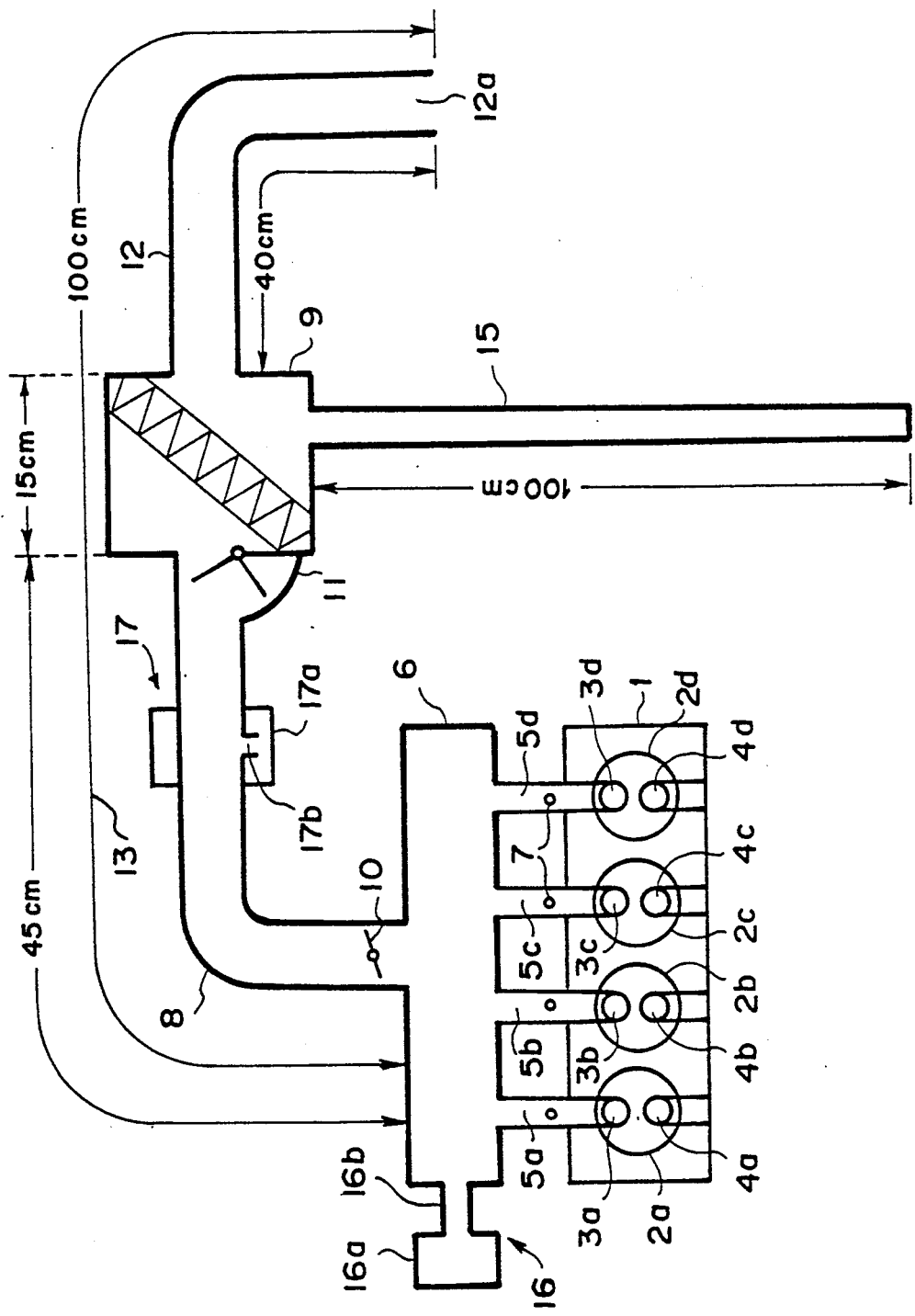

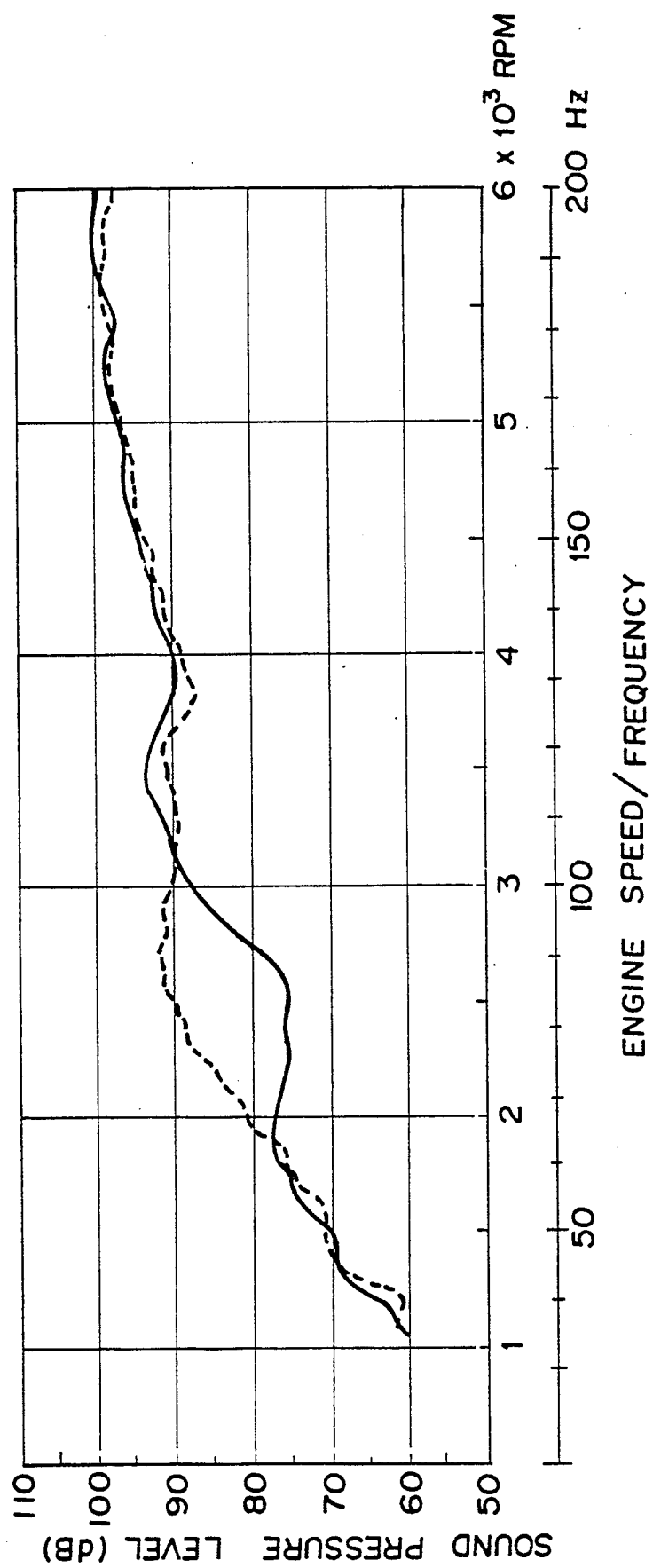

INTAKE SYSTEM FOR MULTIPLE CYLINDER ENGINE

BACKGROUND OF THE INVENTION

1. Field of the Invention

This invention relates to an intake system for a multiple cylinder engine, and more particularly to an intake system for a multiple cylinder engine having an engine intake noise suppressing system for suppressing noise which is generated by the intake stroke of the engine.

2. Description of the Prior Art

Recently, the quietness of the engine has come to be highly required. In order to satisfy this requirement, there have been made various attempts to suppress the intake noise generated by resonance at a particular frequency which is caused due to pulsation of air in the intake passage.

For example, it has been proposed to connect a resonance muffler to the intake passage between the air cleaner and the intake ports, the resonance type muffler having a resonance frequency corresponding to the frequency of oscillation generated in the intake passage, as disclosed in Japanese Unexamined Patent Publication No. 54(1979)-9317. Further, it has been proposed to connect a resonance muffler to the intake passage upstream of the air cleaner, the resonance muffler having a resonance frequency corresponding to the frequency of oscillation generated in the intake passage, as disclosed in Japanese Unexamined Patent Publication 58(1983)-172451 and Japanese Unexamined Utility Model Publication No. 61(1986)-192560. Conventionally, the air cleaner generally has a relatively large volume and cuts off the intake noise. Accordingly, the provisions described above are made for the resonance which occurs in the intake passage upstream of the air cleaner or the intake passage downstream of the same.

However as the maximum output power of engines is increased, the discrete intake passages which connect the respective cylinders to the common intake passage have come to occupy a larger space in the engine room, and the volume of the air cleaner has been reduced. Especially in the fuel injection type engines, a small volume air cleaner is apt to be used. When the volume of the air cleaner, which functions as an expansion type muffler, is small, low frequency range intake noise cannot be cut off.

SUMMARY OF THE INVENTION

In view of the foregoing observations and description, the primary object of the present invention is to provide an intake system for a multiple cylinder engine which comprises a plurality of discrete intake passages which respectively communicate with the cylinders of the engine at the respective downstream ends and merges together at the respective upstream ends so as to form a merging portion, and a common intake passage which communicates with the merging portion at the downstream ends and with the atmosphere by way of an air cleaner at the upstream end, and in which the engine intake noise can be cut off over a wide frequency range.

In accordance with one aspect of the present invention, there is provided an intake system for a multiple cylinder engine comprising a plurality of discrete intake passages which respectively communicate with the cylinders of the engine at the respective downstream ends and merge together at the respective upstream ends so as to form a merging portion, a common intake passage which communicates with the merging portion at the downstream ends and with the atmosphere by way of an air cleaner at the upstream end, and a resonance muffler which communicates with an enlarged volume chamber formed in the intake system upstream of the air cleaner inclusive of the air cleaner and has a resonance frequency which corresponds to the fundamental resonance frequency of the upstream side intake system, the upstream side intake system being the portion of the intake system upstream of the merging portion and the enlarged volume chamber being the largest in cross-section in the upstream side intake system.

Generally, the more downstream a resonance muffler which muffles the intake noise having a frequency corresponding to the fundamental resonance frequency of an intake passage opens to the intake passage, the more the muffling effect of the muffler is. However, if the muffler opens to the intake passage downstream of the air cleaner and the air flow meter, mounting of the muffler becomes difficult and a water drainage hole cannot be formed since air-tightness of the muffler must be ensured.

Accordingly, when the muffler opens to the air cleaner, a muffling effect which is the maximum in the range where the air-tightness of the muffler need not be ensured can be obtained.

Further, the engine intake noise includes low frequency noise which is generated by resonance of the whole intake passage, intermediate frequency noise which is generated by resonance of the discrete intake passages, and high frequency noise which is air flow noise, and it is not preferred that the other noises are increased when the low frequency noise is muffled. When a resonance muffler opens to the intake passage as in the conventional intake system, the intermediate frequency noise is increased due to resonance of the portion of the intake passage on opposite sides of the resonance muffler though the low frequency noise can be suppressed. Assuming that the intake system comprises a surge tank 100 formed by the merging portion of the discrete passages 101, a downstream side portion 102 of a common intake passage, an air cleaner 103 and an upstream side portion 104 of the common intake passage, stationary vibration (intermediate frequency vibration) having nodes at the surge tank 100, the air cleaner (enlarged volume chamber) and the upstream end of the upstream side portion 104 (at which the upstream side portion 104 opens to the atmosphere) is generated. Since the resonance muffler enhances the vibration having a frequency twice the frequncy of the vibration which the resonance muffler suppresses. Accordingly, if the resonance muffler opens to the intake passage, the resonance muffler enhances the stationary vibration shown in FIG. 5. That is, when the noise to be suppressed has a low frequency, the frequency twice the low frequency is an intermediate frequency and accordingly, the intermediate frequency noise is enhanced when the resonance muffler opens to the intake passage. On the other hand, when the resonance muffler opens to the air cleaner (enlarged volume chamber), where the stationary wave has a node, as in the present invention, the intermediate frequency noise cannot be enhanced.

In accordance with another aspect of the present invention, the intake system has a throttle valve which is disposed close to the merging portion of the discrete intake passages in the upstream side intake system, and another (a second) resonance muffler which communicates with an enlarged volume chamber formed in the intake system downstream of the throttle valve and has a resonance frequency which corresponds to the fundamental resonance frequency of the upstream side intake system.

Generally, as described above, the more downstream a resonance muffler which muffles the intake noise having a frequency corresponding to the fundamental resonance frequency of an intake passage opens to the intake passage, the more the muffling effect of the muffler is. Further, the more the capacity of the muffler is, the more the muffling effect is.

However, when a resonance muffler having a large capacity is disposed downstream of the throttle valve, the engine output cannot quickly respond to change of the throttle opening and the running performance of the vehicle deteriorates. Accordingly, when a resonance muffler having such a capacity that will not deteriorates the running performance opens to the intake system downstream of the throttle valve, and another resonance muffler having a large capacity opens to an enlarged volume chamber formed in the intake system upstream of the air cleaner inclusive of the air cleaner, the engine intake noise having a fundamental resonance frequency of the upstream side intake system can be suppressed without adversely affecting the running performance.

BRIEF DESCRIPTION OF THE DRAWINGS

FIG. 1 is a schematic view showing a four-cylinder in-line engine provided with an intake system in accordance with an embodiment of the present invention, FIG. 4 is a graph which shows the relation between the sound pressure level and the frequency in an engine provided with an intake system in accordance with another embodiment of the present invention.

DESCRIPTION OF THE PREFERRED EMBODIMENT

Figure 5:
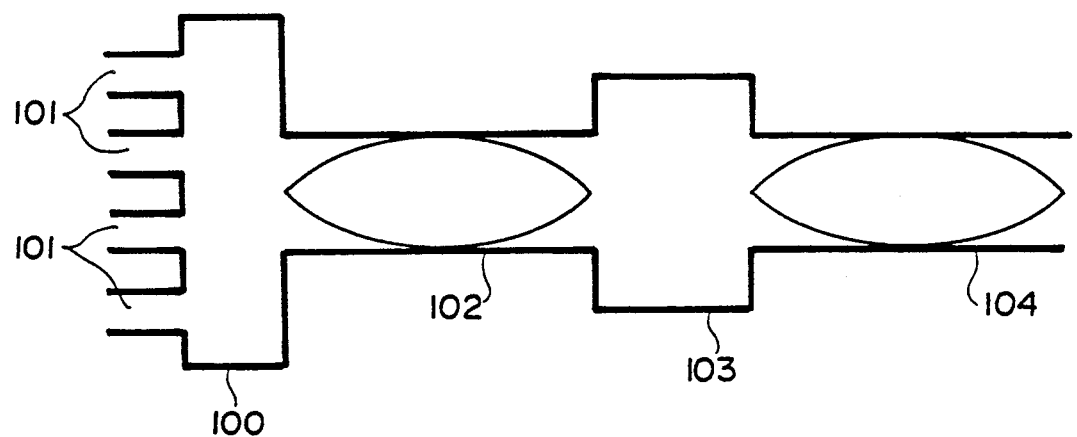
FIG. 5 is a view for illustrating the principle of the present invention.

In FIG. 1, an engine 1 has first to fourth cylinders 2a to 2d which are respectively provided with intake ports 3a to 3d and exhaust ports 4a to 4d. Though not shown, the intake ports 3a to 3d and the exhaust ports 4a to 4d are opened and closed by intake valves and exhaust valves.

The intake ports 3a to 3d communicates with a surge tank 6 respectively by way of discrete intake passages 5a to 5d. A fuel injection valve 7 is disposed in each of the discrete intake passages 5a to 5d. A first portion 8 of a common intake passage is connected to the surge tank 6 at its downstream end and to an air cleaner 9 at its upstream end. The air cleaner 9 forms an enlarged volume chamber. A throttle 10 is provided in the first portion 8 of the common intake passage near the surge tank 6, and an airflow meter 11 is provided in the first portion 8 near the air cleaner 9. A second portion 12 of the common intake passage communicates with the air cleaner 9 at its downstream end and opens to the atmosphere at its upstream end(an opening 12a). The first and second portions 8 and 12 of the common intake passage and the air cleaner 9 forms an upstream side intake system 13.

A first resonator 15 which is of a side branch type is connected to the air cleaner 9 at one end. The other end of the first resonator 15 is closed. The resonance frequency f of the upstream side intake system 13 is given by the following formula.

$$f = c/\lambda, \lambda = l/4 \tag{1}$$

wherein l represents the total length of the upstream side intake system, c represents a speed of sound (approximately 360 m/sec/50° C.) and $\lambda$ represents the wavelength of the sound wave. Assuming that the total length l of the upstream side intake system is 1m, the fundamental resonance frequency fo of the quarter-wave vibration which has a node at the upstream end of the upstream side intake system 13 and an antinode at the downstream end is equal to 360/4 (90 Hz). Since two intake strokes occur for each revolution of the crankshaft in a four-cylinder in-line engine, the frequency of the pulsation of intake air which occurs in the upstream side intake system becomes 90 Hz and resonance sound is generated when the engine speed is 2700 rpm, i.e., when the engine makes 45 revolutions a second. The first resonator 15 has a lowest degree resonance frequency which is substantially equal to the fundamental resonance frequency fo.

Generally, the resonance frequency fp of the side branch type resonator is given by the following formula.

$$fp = \{(2n-1)/4\} \cdot (c/L) \tag{2}$$

wherein L represents the length of the resonator, and n represents a positive integer. In the case of the lowest degree resonance frequency, n is equal to 1. Accordingly, when the length L is 1m, the resonance frequency fp is 90 Hz.

A second resonator 16 which is a Helmholtz resonator having a resonance frequency of 90 Hz is connected to the surge tank 6.

The resonance frequency fp of the Helmholtz resonator is given by the following formula.

$$fp = (c/2\pi)\sqrt{S/VL} \tag{3}$$

wherein V represents the volume of the resonance chamber 16a of the resonator 16, S represents the cross-sectional area of the neck 16b of the resonator 16 and L represents the length of the neck 16b.

Further, a third resonator 17 which is of the Helmholtz type is connected to an intermediate portion of the first portion 8 of the common intake passage. The third resonator 17 has a resonance chamber 17a which communicates with the first portion 8 by way of an opening 17b. The length of the first portion 8 is about 45 cm and the resonance frequency of the third resonator 17 is about 330 Hz which corresponds to the resonance frequency of the first portion 8.

Figure 2:
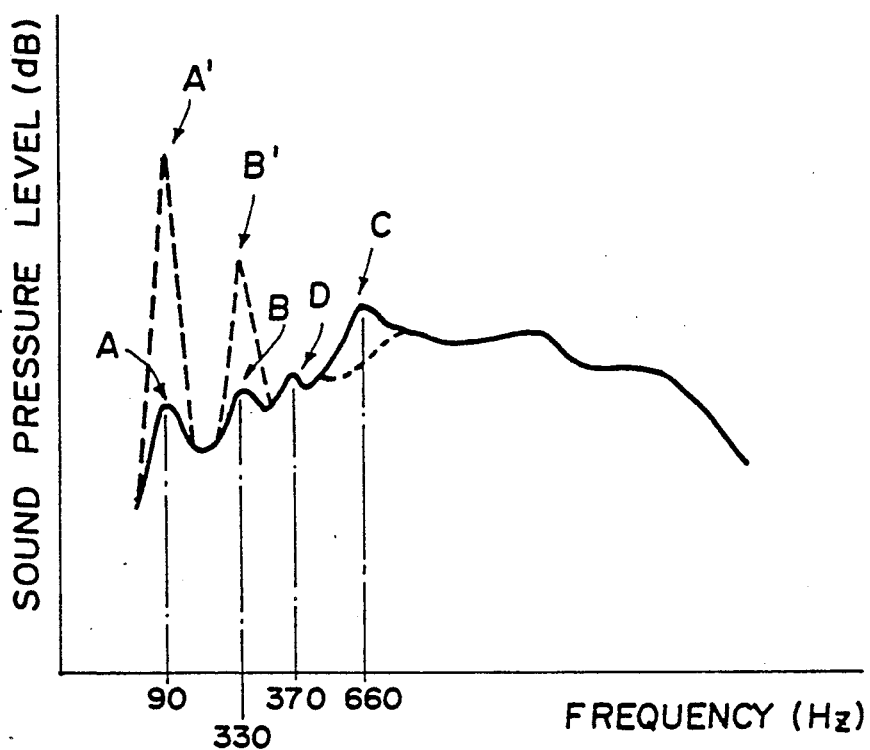
FIG. 2 is a graph which shows the sound pressure level-frequency characteristic curve in the engine.

In FIG. 2, the solid line shows the relation between the sound pressure level and the frequency in the intake system of this embodiment (i.e., in the intake system with the first to third resonators 15 to 17), and the broken line shows that in the intake system without the resonators 15 to 17. As can be understood from FIG. 2, the sound pressure level peak at the resonance frequency of the upstream side intake system which would be at A' (about 90 dB) without the first and second resonators 15 and 16 is lowered to A (about 75 dB) by the resonators 15 and 16. Further, the sound pressure level peak at the resonance frequency of the first portion which would be at B' without the third resonator 17 is lowered to B by the resonator 17. Though a peak C is produced by the third resonator 17, the peak C is low and the adverse effect of the resonator 17 is negligible. The resonance of the second portion 12 of the common intake passage produces a peak D.

Figure 3:
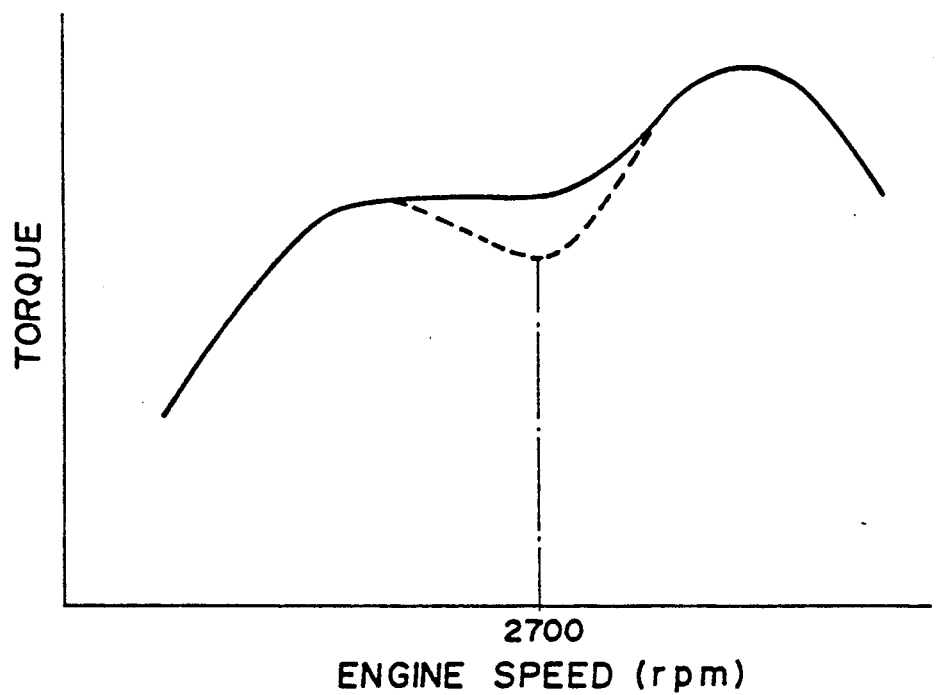
FIG. 3 is a graph which shows the torque engine speed characteristic curve in the engine.

Further, it has been found that the intake system of this embodiment contributes to improvement of the engine speed-torque characteristics. That is, when the length of the discrete intake passages and other factors of the intake system are selected so that an inertia supercharging effect can be obtained in both the low engine speed range and the high engine speed range, a torque characteristic curve as shown by the broken line in FIG. 3 is obtained if the intake system is not provided with the resonators 15 and 16. On the other hand, in the intake system of this embodiment (with the resonators 15 and 16), the bottom of the torque near 2700 rpm is raised and a smooth torque characteristic is obtained.

Though, in the embodiment described above, the intake system is provided with the three resonators, the intake system may be only provided with a single resonator so long as it opens to an enlarged volume chamber formed in the intake system upstream of the air cleaner inclusive of the air cleaner and has a resonance frequency which corresponds to the fundamental resonance frequency of the upstream side intake system as can be understood from FIG. 4, in which the solid line shows the relation between the sound pressure level and the frequency in an intake system with a single resonator which opens to the air cleaner, and the broken line shows that in an intake system without any resonator.

We claim:

1. An intake system for a multiple cylinder engine comprising a plurality of discrete intake passages which respectively communicate with the cylinders of the engine at respective downstream ends and merge together at respective upstream ends so as to form a merging portion, a common intake passage having upstream and downstream ends, said common intake passage communicates with the merging portion at the downstream end and with atmosphere by way of an air cleaner chamber at the upstream end, and a resonance muffler which communicates with an enlarged volume chamber formed in the intake system upstream of an air filter and inclusive of the air cleaner chamber and has a resonance frequency which corresponds to a fundamental resonance frequency of an upstream side intake portion, the upstream side intake portion being the portion of the intake system upstream of the merging portion and the enlarged volume chamber being the largest chamber in cross-section in the upstream side intake portion.

2. An intake system for a multiple cylinder engine comprising a plurality of discrete intake passages which respectively communicate with the cylinders of the engine at respective downstream ends and merge together at respective upstream ends so as to form a merging portion, a common intake passage having upstream and downstream ends, said common intake passage communicates with the merging portion at the downstream end and with atmosphere by way of an air cleaner chamber at the upstream end, a first resonance muffler which communicates with a first enlarged volume chamber formed in the intake system upstream of an air filter and inclusive of the air cleaner chamber and has a resonance frequency which corresponds to a fundamental resonance frequency of an upstream side intake portion, the upstream side intake system portion being the portion of the intake system upstream of the merging portion, a throttle valve which is disposed close to the merging portion of the discrete intake passages in the common intake passage, and a second resonance muffler which communicates with a second enlarged volume 6 chamber formed in the intake system downstream of the throttle valve and has a resonance frequency which corresponds to a fundamental resonance frequency of the upstream side intake portion, the first and second enlarged volume chambers being larger in cross-section than all parts in the upstream side intake portion.

3. An intake system as defined in claim 2 in which said merging portion forms a surge tank and said second enlarged volume chamber is the surge tank.

4. An intake system as defined in claim 3 in which said first resonance muffler is of a side branch type and the second resonance muffler is a Helmholtz type.

* * * * *